(12) United States Patent
Trainin et al.

(10) Patent No.: US 10,142,931 B2
(45) Date of Patent: Nov. 27, 2018

(54) PRIORITIZED ACCESS IN AWAKE WINDOW

(71) Applicant: Intel IP Corporation, Santa Clara, CA (US)

(72) Inventors: Solomon B. Trainin, Haifa (IL); Carlos Cordeiro, Portland, OR (US); Oren Kedem, Modiin Maccabim-Reut (IL); Sebastian Mitelberg, Tzur Yitzhak (IL)

(73) Assignee: Intel IP Corporation, Santa Clara, CA (US)

( * ) Notice: Subject to any disclaimer, the term of this patent is extended or adjusted under 35 U.S.C. 154(b) by 63 days.

(21) Appl. No.: 15/279,293

(22) Filed: Sep. 28, 2016

(65) Prior Publication Data

US 2017/0353923 A1    Dec. 7, 2017

Related U.S. Application Data

(60) Provisional application No. 62/345,209, filed on Jun. 3, 2016.

(51) Int. Cl.
| | |
|---|---|
| *H04W 52/02* | (2009.01) |
| *H04B 7/06* | (2006.01) |
| *H04L 5/00* | (2006.01) |
| *H04W 84/12* | (2009.01) |

(52) U.S. Cl.
CPC ...... *H04W 52/0216* (2013.01); *H04B 7/0617* (2013.01); *H04L 5/0051* (2013.01); *H04W 84/12* (2013.01)

(58) Field of Classification Search
CPC .............. H04W 52/0216; H04W 84/12; H04B 7/0617; H04L 5/0051
USPC ..... 370/349, 252, 311, 310.2, 328, 338, 318
See application file for complete search history.

(56) References Cited

U.S. PATENT DOCUMENTS

2017/0311260 A1* 10/2017 Trainin ............. H04W 52/0229
2017/0353925 A1* 12/2017 Trainin ............. H04W 52/0216

* cited by examiner

*Primary Examiner* — Brenda H Pham
(74) *Attorney, Agent, or Firm* — Schwegman Lundberg & Woessner, P.A.

(57) ABSTRACT

Devices and methods of for wireless communication in a directional multi-gigabit (DMG) band are generally described. A device can detect a starting point of an awake window (AW). The device can encode a first announcement traffic indication message (ATIM) for directional transmission, after no more than a point coordination function (PCF) interframe space (PIFS) subsequent to the starting point, over a first beamformed link to a first station (STA). The device can encode a second ATIM for directional transmission subsequent to directional transmission of the first ATIM, within the AW and in a different direction than the directional transmission of the first ATIM, over a second beamformed link to a second STA. Other devices, systems and methods are also described.

13 Claims, 7 Drawing Sheets

PRIORITIZED ACCESS IN AWAKE WINDOW

PRIORITY CLAIM

This application claims priority under 35 USC 119(e) to U.S. Provisional Patent Application Ser. No. 62/345,209, filed Jun. 3, 2016 which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to IEEE 802.11ad or IEEE 802.11ay. Some embodiments related to directional multi-gigabit (DMG) operations.

BACKGROUND

An Awake Window (AW) provides opportunities for power management in directive multi-gigabit networks. Channel access is limited during AWs. Accordingly, there is a general need to reduce signaling overhead during AWs.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
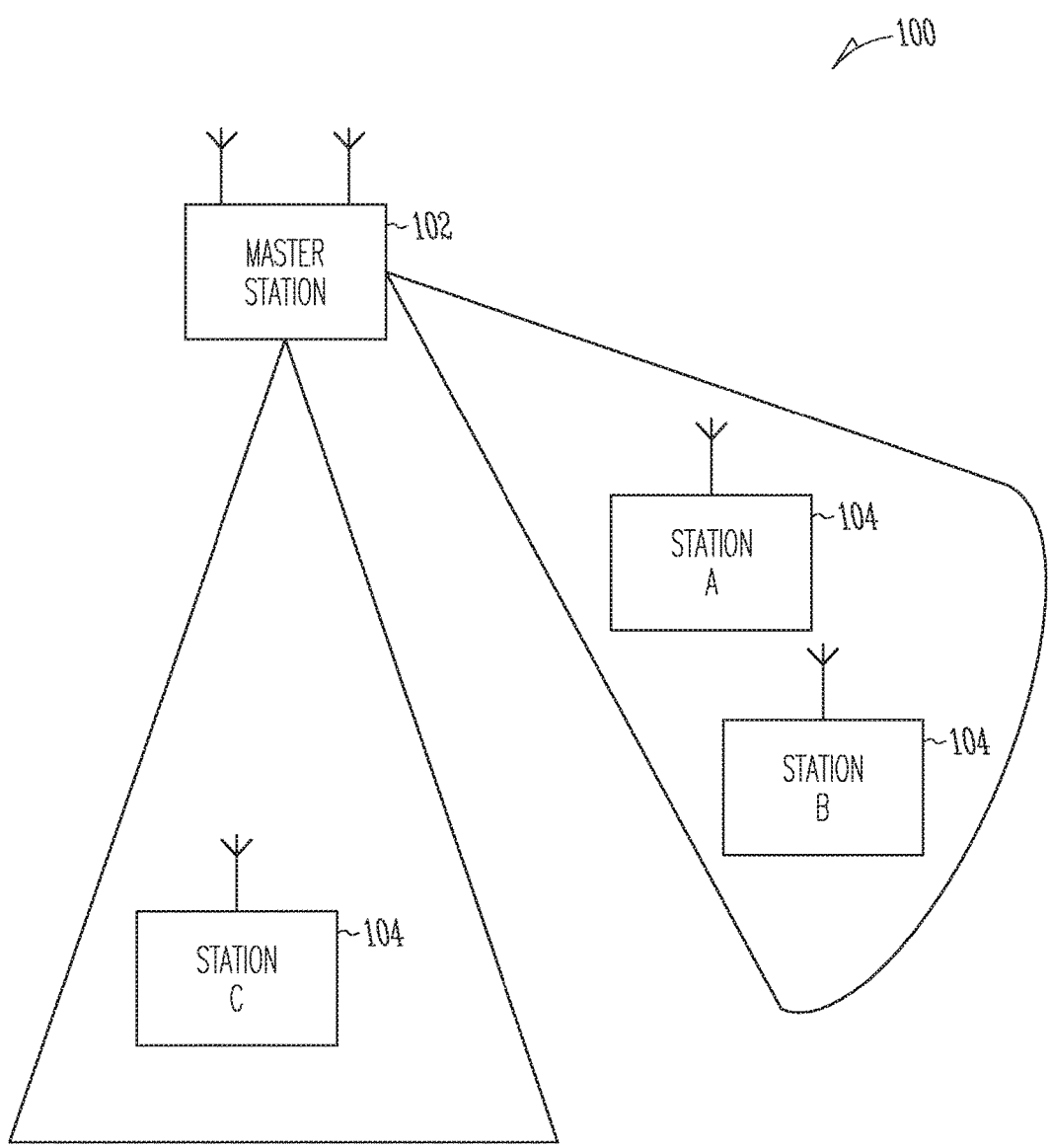
FIG. 1 illustrates a wireless network in accordance with some embodiments.

FIG. 1 illustrates a wireless network in accordance with some embodiments. In some embodiments, the network 100 may be a Directional Multi Gigabit (DMG) network. In some embodiments, the network 100 may be a High Efficiency (HE) Wireless Local Area Network (WLAN), a controlled channel access network, hybrid coordination function (HCF) controlled channel access (HCCA) or Wi-Fi network. These embodiments are not limiting, however, as some embodiments of the network 100 may include a combination of such networks.

The network 100 may include any number (including zero) of master stations (STA) 102, user stations (STAs) 104 and (legacy STAs), 106. It should be noted that in some embodiments, the master station 102 may be a stationary non-mobile device, such as an access point (AP) or personal basic service set (PBSS) control point (PCP) and can be configured to operate in a DMG band. In some embodiments, the STAs 104 may be legacy stations. In some embodiments, the STAs 104 may be DMG devices that can operate in a DMG band, or support DMG operation. It should be noted that embodiments are not limited to the number of master STAs 102, STAs or STAs 104 shown in the example network 100 in FIG. 1.

The master station 102 may be arranged to communicate with the STAs 104 in accordance with one or more of the IEEE 802.11 standards. The master station 102 may use other communications protocols as well as the IEEE 802.11 protocol. The IEEE 802.11 protocol may be IEEE 802.11ay. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA), multiple-input multiple-output (MIMO), multi-user MIMO (MU-MIMO), and/or single-input single-output (SISO). The master station 102 and/or wireless STA 104 may be configured to operate in accordance with NG60, WiGig, and/or IEEE 802.11ay.

The master station 102 may be equipped with large aperture antenna array or Modular Antenna Array (MAA). The master station 102 may be equipped with more than one antenna. Each of the antennas of master station 102 may be a phased array antenna or a directional antenna array with many elements.

The master station 102 may cover STA A 104 and STA B 104 using one beamformed link. The master station 102 may cover STA C 104 using a different beamformed link. The master station 102 may cover other stations (not shown) at other directions relative to the master station 102 using beamformed links.

The wireless STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay or another wireless protocol. In some embodiments, the wireless STAs 104 may operate in accordance with IEEE 802.1 lax. The STAs 104 and/or master station 102 may be attached to a BSS and may also operation IEEE 802.11ay where one of the STAs 104 and/or master station 102 takes the role of the PCP.

An 802.11ay frame may be configured for transmitting a number of spatial streams, which may be in accordance with MU-MIMO. In other embodiments, the master station 102, and/or wireless STA 104 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to 802.11ay communications. In accordance with some IEEE 802.11 ay embodiments, a master station 102 may operate as a master station which may be arranged to contend for a wireless medium (e.g., during a contention period) to receive exclusive control of the medium following a multiple access technique such as CSMA/CD, OFDMA or MU-MIMO. In some embodiments, the multiple-access technique used during the TxOP (transmit opportunity) may be under contention-based access periods (CBAP), scheduled OFDMA technique, although this is not a requirement. In some embodiments, the multiple access technique may be a space-division multiple access (SDMA) technique.

Figure 2:
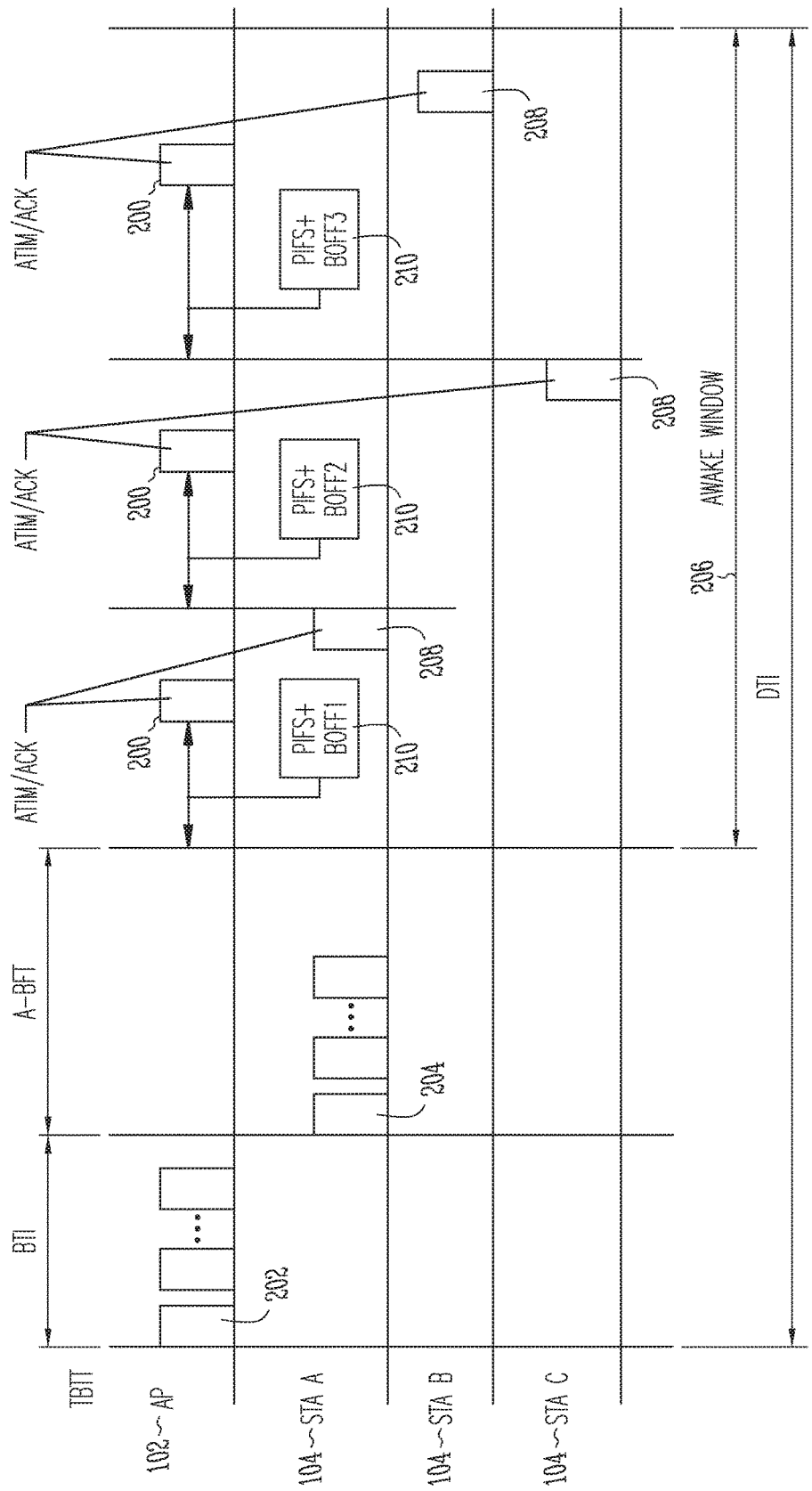
FIG. 2 illustrates an announcement traffic indication message (ATIM) frame delivery by an access point (AP) in accordance with some embodiments.

FIG. 2 illustrates announcement traffic indication message (ATIM) frame 200 delivery by a master station 102, referred to hereinafter as an AP 102.

As shown in FIG. 2, frame delivery includes a beacon transmission interval (BTI). The BTI may contain multiple beacon frames 202, each transmitted by the AP 102 in a different sector to cover all possible directions. Example directions may include directions shown in FIG. 1, for example one direction to cover STA A 104 and STA B 104, and a second direction to cover STA C 104, as well as any other directions not shown in FIG. 1. The association beamforming training (A-BFT) interval is used by STAs 104 to train their antenna sector for communication with the AP 102. During the A-BFT interval, STAs 104 may send a series of sector sweep (SSW) frames to APs 102 204 over different antenna sectors to find the one that provides the best signal quality. A Data Transmission Interval (DTI) may contain one or more CBAPs, (not shown in FIG. 2) and scheduled service periods (SPs, not shown in FIG. 2) in which STAs 104 exchange data frames.

An Awake Window (AW) 206 may play a central role in some embodiments in power management of DMG and extended DMAG (EDMG) networks such as those based on IEEE 802.11ad/IEEE 802.11ay. For example, the AW 206 may be used in some embodiments to allow devices (e.g., STAs 104) that are in low power mode to connect with each other and synchronize data traffic periods. Shorter AW durations save device power. Channel access during an AW 206 may be limited in some embodiments to transmissions of short frames specifically dedicated for power management (PM) purposes. Examples of such transmissions include ATIM frames 200.

In some embodiments, the AP 102 schedules the AW 206. Associated STAs 104 may be aware of the AW 206 scheduling and may operate in accordance with access rules to keep the AW 206 free from any other accesses for power management purposes. The AP 102 may transmit ATIMs 200 individually to each associated STA 104, and the respective associated STA 104 may respond with an ACK 208. However, transmission of multiple ATIM messages by one source (e.g., by the AP 102) may be problematic.

As shown in FIG. 2, when an AP 102 unicasts ATIM messages 200 to each associated STA 104, substantial overhead may be created because backoff (BOFF) time 210 and collision resolution and prevention are needed during each ATIM transmission. Furthermore, unicasting to a large number of STAs 104 can lead to reduced power savings because the total AW 206 duration increases and STAs 104 are awakened and remain awake for the AW 206 duration.

Embodiments address these and other concerns by allowing an AP 102 to transmit multiple group-addressed ATIMs 200 in different directions. Group-addressed ATIMs (as with other group-addressed messages) include specific encoding of the address field that makes it group-addressed versus unicast addressing, and group-addressed frames can be received therefore, by multiple STAs. Each transmission may be separated by a reduced interframe space (RIFS). The number of such frames to wake up associated STAs 104 is equal to number of directions in which the STAs 104 are placed relative to the AP 102 (e.g., two directions in FIG. 1). Accordingly, the number of ATIM frames transmitted may be substantially lower than the case in which a unicast frame is sent to each STA 104. For example, in embodiments, the number of ATIM frames transmitted is limited to be less than equal to the number of directions in which the AP 102 transmits. As a result, in embodiments, the duration of the AW may be reduced, providing power savings. Additionally, reliability of group-addressed ATIM frames may be enhanced through usage of DMG control mode modulation and coding schemes to transmit group-addressed ATIM frames.

Figure 3:
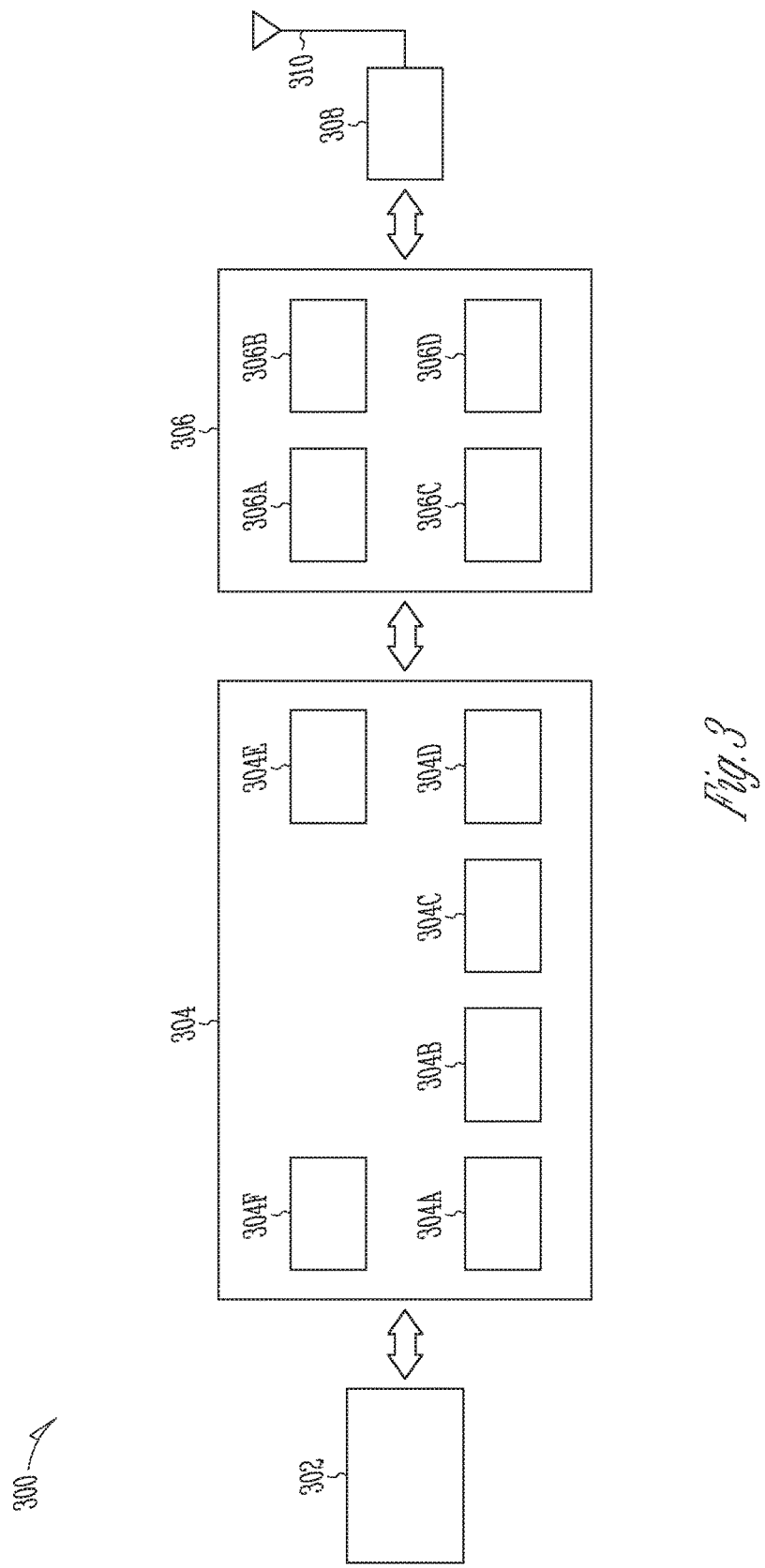
FIG. 3 illustrates components of an apparatus for a communication device in accordance with some embodiments.

FIG. 3 illustrates components of an apparatus of a communication device in accordance with some embodiments. The communication device 300 may be one of the or STAs 104 shown in FIG. 1 and may be a stationary, non-mobile device or may be a mobile device. In some embodiments, other network elements, such as the PCP or AP may contain some or all of the components shown in FIG. 3. In some embodiments, the communication device 300 may include processing circuitry 302.

The application or processing circuitry 302 may include one or more application processors. For example, the processing circuitry 302 may include circuitry such as, but not limited to, any combination of one or more single core or multi-core general-purpose processors and/or dedicated processor, graphics processors, application processors. The processors may be coupled with and/or may include memory/storage to execute instructions stored in the memory/storage to enable various applications and/or operating system operations to run on the system.

Figure 4:
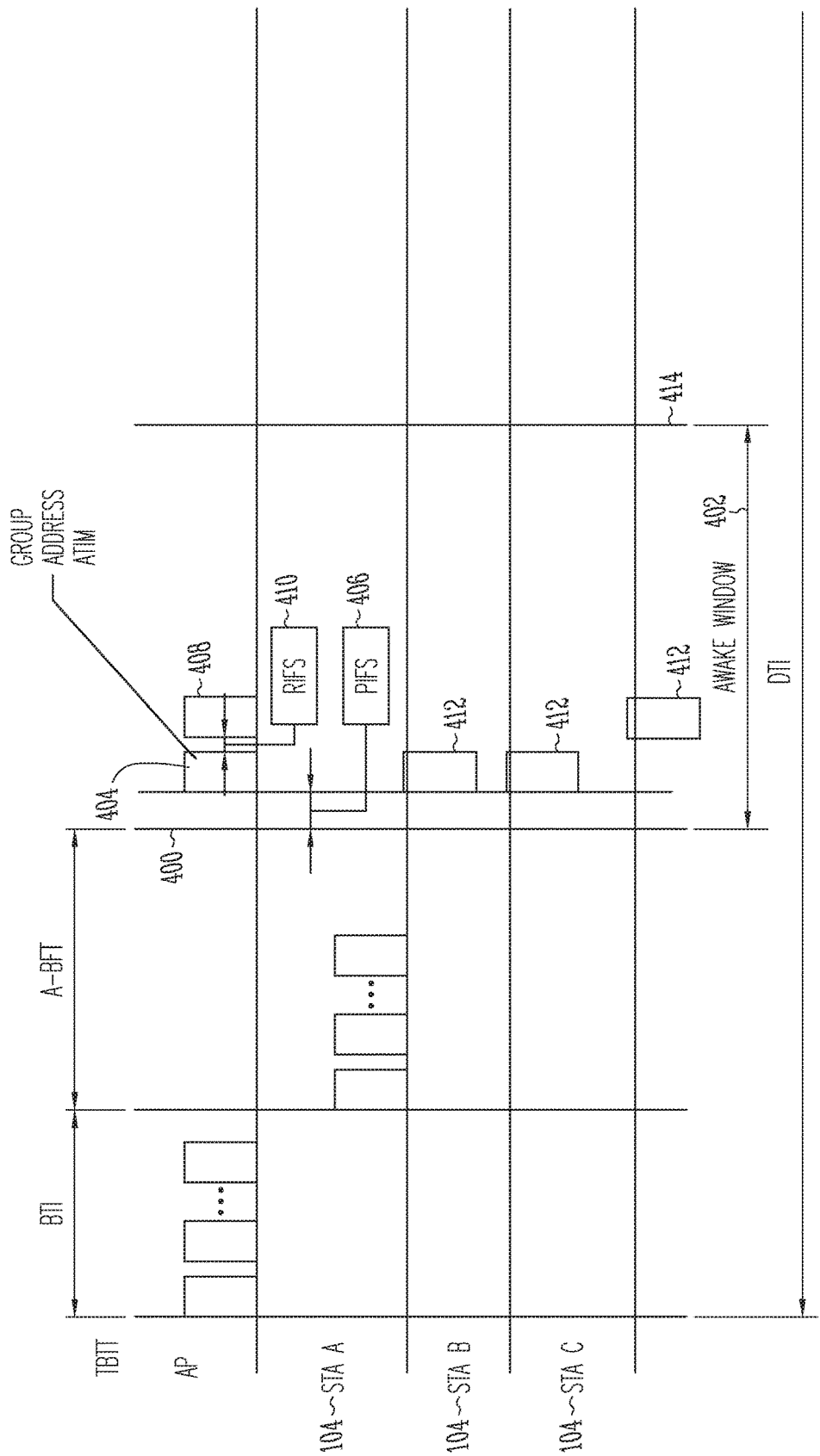
FIG. 4 illustrates group addressed announcement traffic indication message (ATIM) frame delivery in accordance with some embodiments.

For example, when the communication device 300 is acting as a PCP or AP 102 (FIG. 1), with reference to FIG. 4, the processing circuitry 302 may detect a starting point 400 of an AW 402. The processing circuitry 302 may encode (or initiate transmission of) a first ATIM 404 for directional transmission, after no more than a point coordination function (PCF) interframe space (PIFS) 406 subsequent to the starting point, over a first beamformed link to a first STA (e.g., STA A 104 (FIG. 1). The processing circuitry 302 may encode a second ATIM 404 for directional transmission subsequent to directional transmission of the first ATIM, within the AW 402 and in a different direction than the directional transmission of the first ATIM 404, over a second beamformed link to a second STA (e.g., STA C 104). In embodiments, the amount of time between transmission of the first ATIM and the second ATIM is smaller than a short interframe space (SIFS), or equal to a reduced interframe space (RIFS) 410.

In embodiments, at least one of the first ATIM 404 and the second ATIM 404 is addressed to a group of two or more STAs and these are received by the STAs as received ATIMs 412. For example, FIG. 4 depicts that STA A and STA B receive the first group-addressed ATIM 404. An ATIM addressed to a group of two or more STAs is configured to wake each STA in the group of two or more STAs. For example, STA A 104 and STA B 104 may wake upon receiving the first group addressed ATIM 404. In embodiments, the group-addressed ATIM frames are sent to multiple STAS to wake the STAs up to receive group-addressed data frames.

In embodiments, the first ATIM 404 may include a duration field that indicates an ending point in time of a sequence including the first ATIM 404 and the second ATIM 404. In embodiments, the duration field may include the ending point 414 or an indication of the ending point 414 of the AW 402. In embodiments, the interval covered by the values in the duration field ends at the end of the last group-addressed ATIM. The processing circuitry may suspend decrementing of a BOFF timer during the AW 402, such that the device 300 does not wait for expiration of the BOFF timer between the starting point 400 of the AW and transmission of the first ATIM 404.

As can be appreciated through comparison of FIG. 2 and FIG. 4, the AW 402 may be reduced, in comparison to the AW 206 (FIG. 2). For example, the distance between the transmitted ATIM frames 404 may be a RIFS 410, rather than at least PIFS+BOFF 210. Furthermore, rather than sending an ATIM to each STA A, STA B, STA C sequentially as shown in FIG. 2 in order to wake STA A, STA B and STA C, the AP/PCP 102 in example embodiments may wake each STA in a given direction with one group-addressed ATIM 404. In the example shown in FIG. 4, the time to wake STA A 104, STA B 104, and STA C 104 may be given by PIFS+2·frametime$_{ATIM}$+RIFS, where PIFS is the time required for a point coordination function (PCF) interframe space, frametime$_{ATIM}$ is the amount of time needed to transmit an ATIM frame, and RIFS is a reduced interframe space shorter than PIFS.

In contrast, the amount of time to wake STA A 104, STA B 104, and STA C 104 in the example shown in FIG. 2 is given by:

$$3 \cdot PIFS + 3 \cdot SIFS + 3 \cdot frametime_{ATIM} + 3 \cdot frametime_{ACK} + BOFF1 + BOFF2 + BOFF3$$

where SIFS is a short interframe space, frametime$_{ACK}$ is the frame time needed to transmit an ACK, and BOFF1, BOFF2 and BOFF3 are backoff times needed to reduce collisions. Accordingly, in example embodiments, the AW 406 time may be reduced, leading to improved power savings for devices in the network 100.

Referring again to FIG. 3, the communication device 300 may include baseband circuitry 304, Radio Frequency (RF) circuitry 306, front-end module (FEM) circuitry 308 and one or more antennas 310, coupled together at least as shown. At least some of the baseband circuitry 304, RF circuitry 306, and FEM circuitry 308 may form a radio transceiver. The baseband circuitry 304 may include circuitry such as, but not limited to, one or more single-core or multi-core processors. The baseband circuitry 304 may generate the first ATIM 404 and the second ATIM 404 described earlier herein with respect to FIG. 4. The radio transceiver may couple to the processing circuitry 302 and be configured to operate in a millimeter-wave band.

The baseband circuitry 304 may include one or more baseband processors and/or logic control to process baseband signals received from a receive signal path of the RF circuitry 306 and to generate baseband signals for a transmit signal path of the RF circuitry 306. Baseband circuitry 304 may interface with the processing circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development or to be developed in the future (e.g., fifth generation (5G), 6G, etc.). The baseband circuitry 304 (e.g., one or more of baseband processors 304a-d) may handle various radio control functions that enable communication with one or more radio networks via RF circuitry 306. The radio control functions may include, but are not limited to, single modulation/demodulation, encoding/decoding, radio frequency modulation/demodulation shifting. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 304e of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304f. The audio DSP(s) 304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the processing circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio (EUTRAN) and/other wireless area metropolitan networks (WMAN), wireless local area network (WLAN), wireless personal area network (WPAN). Embodiments in which the baseband circuitry 304 is configured to support radio communications of more than one wireless protocol may be referred to as multi-mode baseband circuitry. In some embodiments, the device may be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802 ad, which operates in the 60 GHz millimeter wave spectrum, and 802.1 lax, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 306 may enable communication with wireless networks using electromagnetic radiation though a non-solid medium. In various embodiments, the modulation RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the processing circuitry 302 depending on the desired output frequency. In some embodiments, a divider control input (e.g., N) may be determined from a look-up table based on a channel indicated by the processing circuitry 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310.

In some embodiments, the FEM circuitry 308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the communication device 300 may include additional elements such as, for example, memory/storage, display, camera, sensor, and/or input/output (I/O) interface.

The antennas 310 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 310 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
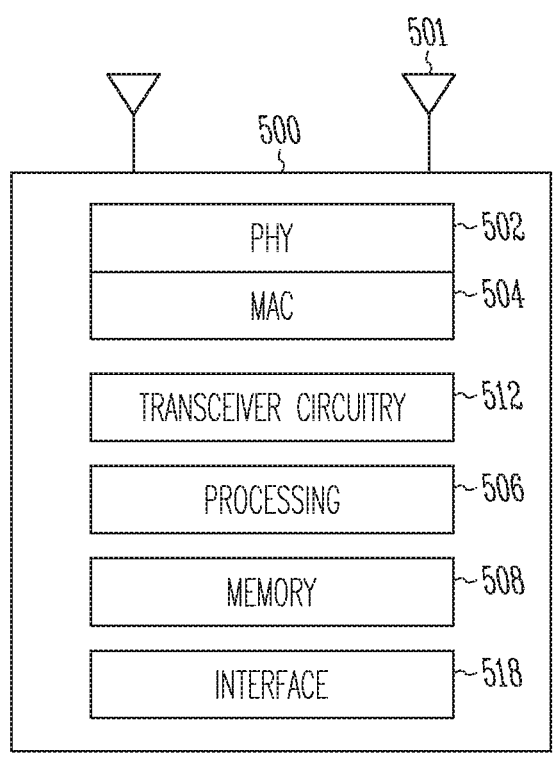
FIG. 5 illustrates a block diagram of an apparatus for a communication device in accordance with some embodiments.

FIG. 5 is a block diagram of an apparatus of a communication device in accordance with some embodiments. The communication device 500 may be a STA 104 or AP 102 shown in FIG. 1. Some of the components shown in FIG. 5 may not be present in all of the devices in FIG. 1.

The communication device 500 may include physical layer circuitry 502 for enabling transmission and reception of signals to and from the AP/PCP 102, other STAs 104, APs and/or other devices using one or more antennas 501. The physical layer circuitry 502 may perform various encoding and decoding functions that may include formation of baseband signals for transmission and decoding of received signals. The communication device 500 may also include medium access control layer (MAC) circuitry 504 for controlling access to the wireless medium. The communication device 500 may also include processing circuitry 506, such as one or more single-core or multi-core processors, and memory 508 arranged to perform the operations described herein. The physical layer circuitry 502, MAC circuitry 504 and processing circuitry 506 may handle various radio control functions that enable communication with one or more radio networks compatible with one or more radio technologies. The radio control functions may include signal modulation, encoding, decoding, radio frequency shifting, etc. For example, similar to the device shown in FIG. 3, in some embodiments, communication may be enabled with one or more of a WMAN, a WLAN, and a WPAN. In some embodiments, the communication device 500 can be configured to operate in accordance with 3GPP standards or other protocols or standards, including WiMax, WiFi, GSM, EDGE, GERAN, UMTS, UTRAN, or other 3G, 3G, 4G, 5G, etc. technologies either already developed or to be developed. The communication device 500 may include transceiver circuitry 512 to enable communication with other external devices wirelessly and interfaces 514 to enable wired communication with other external devices. As another example, the transceiver circuitry 512 may perform various transmission and reception functions such as conversion of signals between a baseband range and a Radio Frequency (RF) range.

The antennas 501 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 501 may be effectively separated to take advantage of spatial diversity and the different channel characteristics that may result.

Although the communication device 500 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

In accordance with embodiments, and with further reference to elements of FIG. 4, when the device 500 is operating as a STA 104, processing circuitry 506 may detect a starting point of an AW 402. Within a PIFS 406 from the starting point 400 of the AW 402, the processing circuitry 506 may decode an ATIM 404 received in a directional transmission over a beamformed link from a PCP 102, the ATIM 404 being addressed to a group of STAs, e.g., a group of STAs 104 within a direction of the PCP 102. In embodiments, the processing circuitry 506 may wake from a sleep mode during the AW 402 upon receiving the ATIM 404 and remain awake for at least a duration of the AW 402 indicated in the ATIM 404 to synchronize timing with at least other STAs in the group of STAs.

Figure 6:
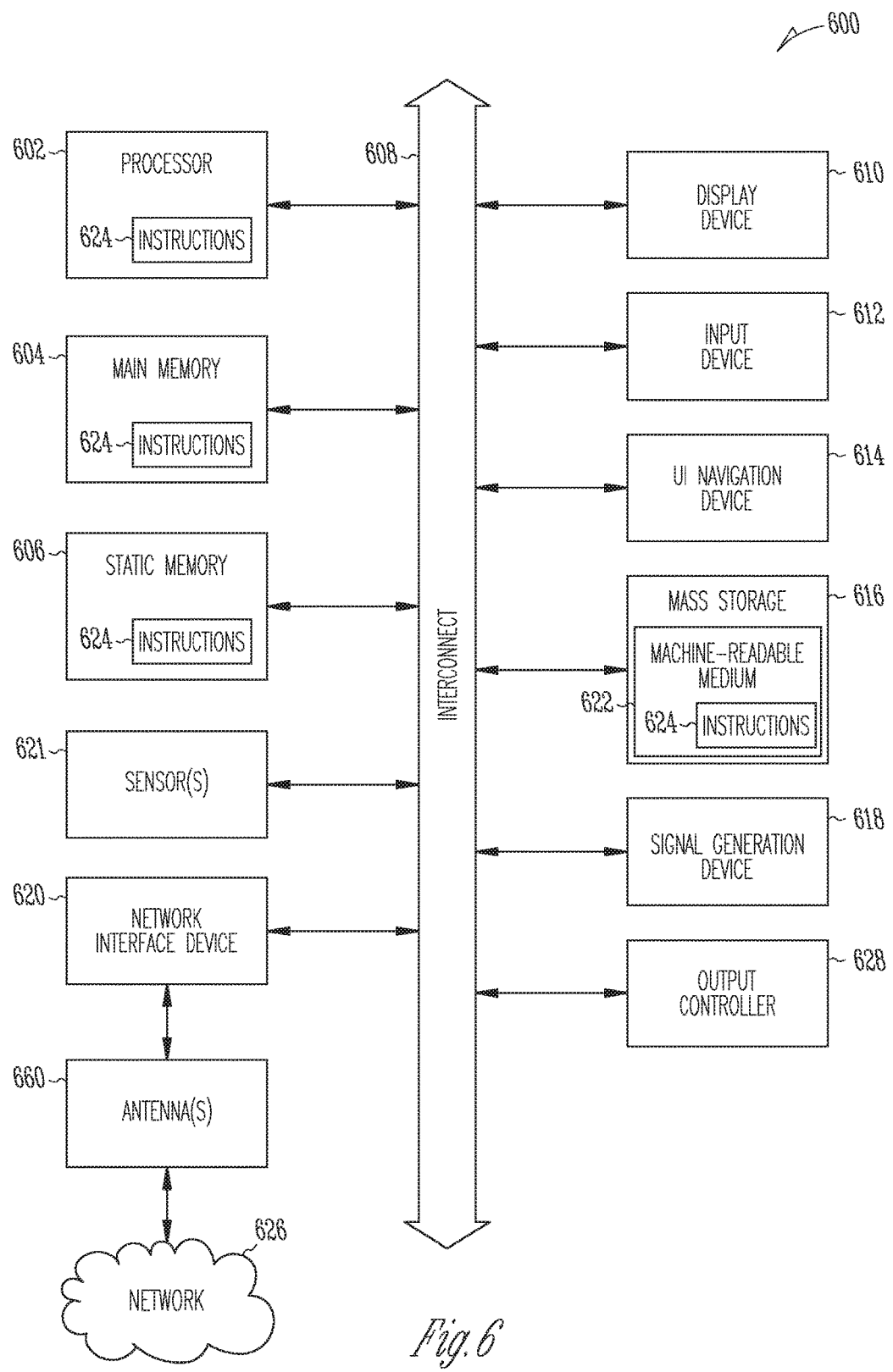
FIG. 6 illustrates another block diagram of an apparatus for a communication device in accordance with some embodiments.

FIG. 6 illustrates another block diagram of an apparatus of a communication device in accordance with some embodiments. In alternative embodiments, the communication device 600 may operate as a standalone device or may be connected (e.g., networked) to other communication devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 600 may be a UE, eNB, AP, PCP, STA, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Communication device (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The communication device 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The communication device 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The communication device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a communication device readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the communication device 600. In an example, one or any combination of the hardware processor 602, the main memory 604, the static memory 606, or the storage device 616 may constitute a computer-readable storage medium.

While the computer-readable storage medium 622 is illustrated as a single medium, the term "computer-readable storage medium" may include a single medium or multiple media (e.g., a centralized or distributed database, and/or associated caches and servers) configured to store the one or more instructions 624.

The term "computer-readable storage medium" may include any medium that is capable of storing, encoding, or carrying instructions for execution by the communication device 600 and that cause the communication device 600 to perform any one or more of the techniques of the present disclosure, or that is capable of storing, encoding or carrying data structures used by or associated with such instructions. For example, the instructions can cause the communication device 600 to detect a starting point of an AW; after a PIFS from the starting point of the AW, encode a first group-addressed ATIM for directional transmission over a first beamformed link to a first group of STAs to wake the first group of STAs; and within a RIFS smaller than a short interframe space (SIFS), subsequent to the first ATIM and within the AW, encode a second group-addressed ATIM for directional transmission over a second beamformed link to a second group of STAs to wake the second group of STAs. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards, IEEE 802.16 family of standards), IEEE 802.15.4 family of standards, a LTE family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), MIMO, or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the communication device 600, and includes digital or analog communications signals or other intangible medium to facilitate communication of such software.

Figure 7:
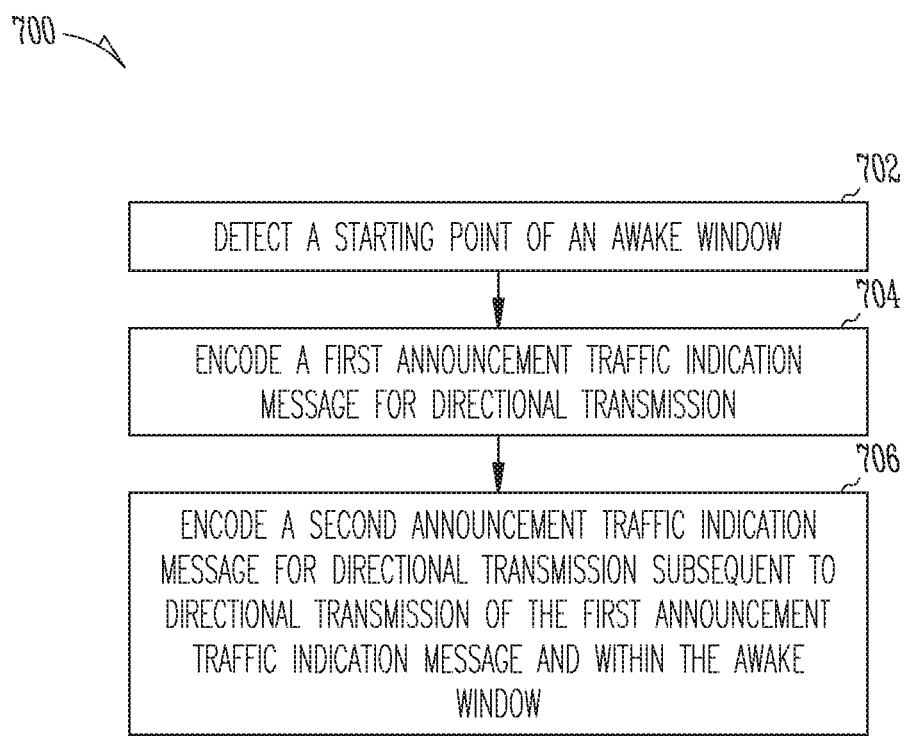
FIG. 7 is a flowchart of a method in accordance with some embodiments.

FIG. 7 illustrates a method of for operating in a DMG network in accordance with some embodiments. The method may be performed by any of the APs/PCPs 102 shown and described in FIGS. 1-6. Embodiments of the method may thus include additional or fewer operations or processes in comparison to what is illustrated in FIG. 7. In addition, embodiments of the method are not necessarily limited to the chronological order that is shown in FIG. 7. The method may be practiced with suitable systems, interfaces and components. In addition, while the method and other methods described herein may refer to APs/PCPs 102 operating in accordance with IEEE 802.11 or other standards, embodiments of those methods are not limited to just those APs/PCPs and may also be practiced by other communication devices.

The example method begins at operation 702 with the AP/PCP 102 detecting a starting point of an AW.

The example method continues at operation 704 after a PIFS from the starting point of the AW, with the AP/PCP 102 directionally transmitting a first group-addressed ATIM (e.g., ATIM 404 (FIG. 4)) over a first beamformed link to a first group of STAs (e.g., STA A 104 and STA B 104) to wake the first group of STAs.

The example method 700 continues with operation 706 with the AP/PCP 102 directionally transmitting, a second group-addressed ATIM over a second beamformed link different from the first beamformed link to a second group of STAs to wake the second group of STAs. The second group-addressed ATIM may be transmitted in the same AW (e.g., AW 402) as the first group-addressed ATIM. The second group-addressed ATIM being transmitted within no more than a RIFS smaller than a SIFS subsequent to the first ATIM.

The AP/PCP 102 may directionally transmit any number of group-addressed ATIMs to groups of STAs. The number of group-addressed ATIMs may be limited by the number of directions in which the AP/PCP 102 can transmit. For example, the number of group-addressed ATIMs may be limited by the number of directional antennas. These groups of STAs may be grouped according to their relative direction from the AP/PCP. Each ATIM may be separated by no more than an RIFS (which is in turn smaller than an SIFS), and the ATIMs may all be transmitted within one AW, to wake each STA served by the AP/PCP.

In Example 1, an apparatus for wireless communication device may comprise: memory; and processing circuitry, to configure the device to communicate over a directional multi-gigabit (DMG) band, wherein the processing circuitry is configured to: detect a starting point of an awake window (AW); encode a first announcement traffic indication message (ATIM) for directional transmission, after no more than a point coordination function (PCF) interframe space (PIFS) subsequent to the starting point, over a first beamformed link to a first station (STA); and encode a second ATIM for directional transmission subsequent to directional transmission of the first ATIM, within the AW and in a different direction than the directional transmission of the first ATIM, over a second beamformed link to a second STA.

In Example 2, the subject matter of Example 1 can optionally include wherein an amount of time between transmission of the first ATIM and the second ATIM is smaller than a short interframe space (SIFS).

In Example 3, the subject matter of any of Examples 1-2 can optionally include wherein the amount of time between transmission of the first ATIM and the second ATIM equals a reduced interframe space (RIFS.

In Example 4, the subject matter of Example 2 can optionally include wherein the wireless communication device is a personal basic service set (PBSS) control point (PCP) and wherein the first ATIM and the second ATIM are group-addressed to STAs within a basic service set (BSS) served by the PCP.

In Example 5, the subject matter of Example 4 can optionally include wherein at least one of the first group-addressed ATIM and the second group-addressed ATIM is configured to wake each STA in a group of two or more STAs.

In Example 6, the subject matter of any of Examples 1-5 can optionally include wherein the first ATIM includes a duration field that indicates an ending point in time of a sequence including the first ATIM and the second ATIM.

In Example 7, the subject matter of any of Examples 1-6 can optionally include wherein the processing circuitry is further configured to suspend decrementing of a backoff (BOFF) timer during the AW, to inhibit the device from waiting for expiration of the BOFF timer between the starting point of the AW and transmission of the first ATIM.

In Example 8, the subject matter of any of Examples 1-7 can optionally include baseband circuitry to generate the first ATIM and the second ATIM.

In Example 9, the subject matter of any of Examples 1-8 can optionally include a radio transceiver coupled to the processing circuitry and configured to operate in a millimeter-wave band.

In Example 10, the subject matter of Example 9 can optionally include a directional antenna array connected to the radio transceiver and operated by the processing circuitry to provide directional transmission and reception.

In Example 11, the subject matter of any of Examples 1-10 can optionally include wherein the second beamformed link is different from the first beamformed link.

In Example 12, a computer-readable storage medium may store instructions for execution by processing circuitry of a wireless communication device to configure the device to: detect a starting point of an awake window (AW); after a point coordination function (PCF) interframe space (PIFS) from the starting point of the AW, encode a first group-addressed announcement traffic indication message (ATIM) for directional transmission over a first beamformed link to a first group of stations (STAs) to wake the first group of STAs; and within a reduced interframe space (RIFS) smaller than a short interframe space (SIFS), subsequent to the first ATIM and within the AW, encode a second group-addressed ATIM for directional transmission over a second beamformed link to a second group of STAs to wake the second group of STAs.

In Example 13, the subject matter of Example 12 can optionally include wherein the processing circuitry further configures the device to: communicate in a directional multi-gigabit (DMG) band in a wireless network.

In Example 14, the subject matter of any of Examples 12-13 can optionally include wherein the wireless communication device is a personal basic service set (PBSS) control point (PCP) and wherein the first ATIM and the second ATIM are addressed to STAs within a basic service set (BSS) served by the PCP.

In Example 15, the subject matter of any of Examples 12-14 can optionally include wherein the first ATIM includes a duration field that indicates an ending point in time of a sequence including the first ATIM and the second ATIM.

In Example 16, the subject matter of any of Examples 12-15 can optionally include wherein the processing circuitry further configures the device to: suspend decrementing of a backoff (BOFF) timer during the AW, to inhibit the device from waiting for expiration of the BOFF timer between the starting point of the AW and transmission of the first ATIM.

In Example 17, an apparatus for a user station (STA) can comprise: memory and processing circuitry to configure the device to communicate over a directional multi-gigabit (DMG) band in a wireless network, wherein the processing circuitry is configured to: detect a starting point of an awake window (AW); and within a point coordination function (PCF) interframe space (PIFS) from the starting point of the AW, decode an announcement traffic indication message (ATIM) received in a directional transmission over a beamformed link from a personal basic service set (PBSS) control point (PCP), the ATIM being addressed to a group of STAs.

In Example 18, the subject matter of Example 17 can optionally include wherein the processing circuitry is configured to wake from a sleep mode during the AW and for at least a duration of the AW indicated in the ATIM to synchronize timing with at least other STAs in the group of STAs.

In Example 19, a method for operating in a directional multi-gigabit (DMB) network can comprise: detecting a starting point of an awake window (AW); after a point coordination function (PCF) interframe space (PIFS) from the starting point of the AW, directionally transmitting a first group-addressed announcement traffic indication message (ATIM) over a first beamformed link to a first group of stations (STAs) to wake the first group of STAs; and directionally transmitting, within the AW, a second group-addressed ATIM over a second beamformed link different from the first beamformed link to a second group of STAs to wake the second group of STAs, the second group-addressed ATIM being transmitted within no more than a reduced interframe space (RIFS) smaller than a short interframe space (SIFS) and subsequent to the first ATIM.

In Example 20, the subject matter of Example 19 can optionally include directionally transmitting additional group-addressed ATIMs within the AW, each additional ATIM being transmitted in a direction served by a personal basic service set (PBSS) control point (PCP) in which there at exists at least one STA being served by the PCP, each additional ATIM being separated in time by no more than one RIFS.

In Example 21, the subject matter of any of Examples 19-20 can optionally include wherein the first ATIM includes a duration field that indicates an ending point in time of a sequence including the first ATIM, the second ATIM.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

What is claimed is:

1. An apparatus for wireless communication device, the apparatus comprising:
memory; and processing circuitry, to configure the device to communicate over a directional multi-gigabit (DMG) band, wherein the processing circuitry is configured to:
detect a starting point of an awake window (AW);
encode a first announcement traffic indication message (ATIM) for directional transmission, after no more than a point coordination function (PCF) interframe space (PIFS) subsequent to the starting point, over a first beamformed link to a first station (STA); and
encode a second ATIM for directional transmission subsequent to directional transmission of the first ATIM, within the AW and in a different direction than the directional transmission of the first ATIM, over a second beamformed link to a second STA, wherein the amount of time between transmission of the first ATIM and the second ATIM equals a reduced interframe space (RIFS).

2. The apparatus of claim 1, wherein the wireless communication device is a personal basic service set (PBSS) control point (PCP) and wherein the first ATIM and the second ATIM are group-addressed to STAs within a basic service set (BSS) served by the PCP.

3. The apparatus of claim 2, wherein at least one of the first group-addressed ATIM and the second group-addressed ATM is configured to wake each STA in a group of two or more STAs.

4. The apparatus according to claim 1, wherein the first ATIM includes a duration field that indicates an ending point in time of a sequence including the first ATIM and the second ATIM.

5. The apparatus according to claim 1, wherein the processing circuitry is further configured to:
suspend decrementing of a backoff (BOFF) timer during the AW, to inhibit the device from waiting for expiration of the BOFF timer between the starting point of the AW and transmission of the first ATIM.

6. The apparatus according to claim 1, further comprising baseband circuitry to generate the first ATIM and the second ATIM.

7. The apparatus of claim 1, further comprising a radio transceiver coupled to the processing circuitry and configured to operate in a millimeter-wave band.

8. The apparatus of claim 7, further comprising a directional antenna array connected to the radio transceiver and operated by the processing circuitry to provide directional transmission and reception.

9. The apparatus of claim 1, wherein he second beamformed link is different from the first beamformed link.

10. A non-transitory computer-readable storage medium that stores instructions for execution by processing circuitry of a wireless communication device, the processing circuitry to configure the device to:
communicate in a directional multi-gigabit (DMG) band in a wireless network;
detect a starting point of an awake window (AW);
after a point coordination function (PCF) interframe space (PIFS) from the starting point of the AW, encode a first group-addressed announcement traffic indication message (ATIM) for directional transmission over a first beamformed link to a first group of stations (STAs) to wake the first group of STAs; and
within a reduced interframe space (RIFS) smaller than a short interframe space (SIFS), subsequent to the first ATIM and within the AW, encode a second group-addressed ATIM for directional transmission over a second beamformed link to a second group of STAs to wake the second group of STAs.

11. The non-transitory computer-readable storage medium of claim 10, wherein the wireless communication device is a personal basic service set (PBSS) control point (PCP) and wherein the first ATIM and the second ATIM are addressed to STAs within a basic service set (BSS) served by the PCP.

12. The non-transitory computer-readable storage medium of claim 10, wherein the first ATIM includes a duration field that indicates an ending point in time of a sequence including the first ATIM and the second ATIM.

13. The non-transitory computer-readable storage medium of claim 10, wherein the processing circuitry further configures the device to:
   suspend decrementing of a backoff (BOFF) timer during the AW, to inhibit the device from waiting for expiration of the BOFF timer between the starting point of the AW and transmission of the first ATIM.

* * * * *

UNITED STATES PATENT AND TRADEMARK OFFICE
CERTIFICATE OF CORRECTION

PATENT NO. : 10,142,931 B2  
APPLICATION NO. : 15/279293  
DATED : November 27, 2018  
INVENTOR(S) : Trainin et al.

Page 1 of 1

It is certified that error appears in the above-identified patent and that said Letters Patent is hereby corrected as shown below:

In the Claims

In Column 16, Line 27, in Claim 3, delete "ATM" and insert --ATIM-- therefor

In Column 16, Line 49, in Claim 9, delete "he" and insert --the-- therefor

Signed and Sealed this  
Seventh Day of April, 2020

Andrei Iancu  
*Director of the United States Patent and Trademark Office*